(12) United States Patent
Kritt et al.

(10) Patent No.: US 8,893,028 B2
(45) Date of Patent: Nov. 18, 2014

(54) SUPPLEMENTARY CALCULATION OF NUMERIC DATA IN A WEB BROWSER

(75) Inventors: Barry Alan Kritt, Raleigh, NC (US); Sarbajit Kumar Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 13/237,933

(22) Filed: Sep. 21, 2011

(65) Prior Publication Data

US 2013/0073991 A1 Mar. 21, 2013

(51) Int. Cl.
*G06F 3/00* (2006.01)
*G06Q 10/10* (2012.01)

(52) U.S. Cl.
CPC ........................ *G06Q 10/10* (2013.01)
USPC ............................. 715/760; 715/735; 715/747

(58) Field of Classification Search
None
See application file for complete search history.

(56) References Cited

U.S. PATENT DOCUMENTS

| | | | | |
|---|---|---|---|---|
| 6,732,102 | B1* | 5/2004 | Khandekar | 1/1 |
| 7,143,143 | B1* | 11/2006 | Thompson | 709/217 |
| 7,549,115 | B2* | 6/2009 | Kotler et al. | 715/212 |
| 7,571,191 | B2* | 8/2009 | Dill et al. | 1/1 |
| 7,689,929 | B2* | 3/2010 | Ruthfield et al. | 715/805 |
| 7,827,205 | B2* | 11/2010 | Okunseinde et al. | 707/802 |
| 8,255,819 | B2* | 8/2012 | Chang et al. | 715/769 |
| 8,365,082 | B2* | 1/2013 | Skirpa | 715/760 |
| 2004/0237030 | A1 | 11/2004 | Malkin | 715/505 |
| 2006/0156221 | A1 | 7/2006 | Chen et al. | 715/509 |
| 2009/0177973 | A1 | 7/2009 | Shilo et al. | 715/744 |
| 2009/0183062 | A1 | 7/2009 | Pally | 715/217 |
| 2011/0035744 | A1 | 2/2011 | Bhatia | 717/174 |

FOREIGN PATENT DOCUMENTS

WO    WO 01/67285    9/2001    ............. G06F 17/00

OTHER PUBLICATIONS

"Excel user who wants to create online calculators," Framtidsforum I&M AB, Sweden, downloaded from http://www.exceleverywhere.com/excel-online-calculator.htm on May 11, 2011, publication date unknown.

* cited by examiner

*Primary Examiner* — Anil N Kumar
(74) *Attorney, Agent, or Firm* — VanLeeuwen & VanLeeuwen; Steven L. Bennett

(57) ABSTRACT

An approach is provided in which a user selection is received with the selection being a number data elements with each of the selected data elements being displayed in a Web browser software application. A first set of functions that apply to the selected data elements is identified and the identified first set of functions is applied to the selected data elements. The result is a set of resulting values which are displayed a window that appears on the display screen. If the user has selected numeric data then numeric functions are applied to the data, however if the user has selected date-type data then date functions are applied to the data.

20 Claims, 8 Drawing Sheets

US 8,893,028 B2

SUPPLEMENTARY CALCULATION OF NUMERIC DATA IN A WEB BROWSER

TECHNICAL FIELD

The present disclosure relates to an approach used to calculate numeric values using textual data displayed on a Web browser.

BACKGROUND OF THE INVENTION

Web browsers are versatile software applications that are often used to display data from Web sites or other network sources, such as those found on the Internet. Examples of numeric data displayed as textual data in a Web browser include sports scores, stock data, Internet banking data and reports, and the like. Because the data displayed on the Web page is textual, rather than numeric, a user has to copy and paste the data into another application, such as a spreadsheet, in order to perform numeric calculations on the data. This causes additional time and effort on the part of the user and also requires use of a secondary program in order to process the data.

SUMMARY

An approach is provided in which a user selection is received with the selection being a number data elements with each of the selected data elements being displayed in a Web browser software application. A first set of functions that apply to the selected data elements is identified and the identified first set of functions is applied to the selected data elements. The result is a set of resulting values which are displayed a window that appears on the display screen. If the user has selected numeric data then numeric functions are applied to the data, however if the user has selected date-type data then date functions are applied to the data.

In one embodiment, the user can configure the tool and select the functions that the user would like to have performed on the data. In a further embodiment, after viewing the results, the user can re-configure the tool in order to have different functions that process the already-selected data elements. In another embodiment, the user can request to copy the results to one or more buffers. In this further embodiment, if two buffers are used, one buffer is used to store the function names while the second buffer is used to store the numeric results in a numeric format.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
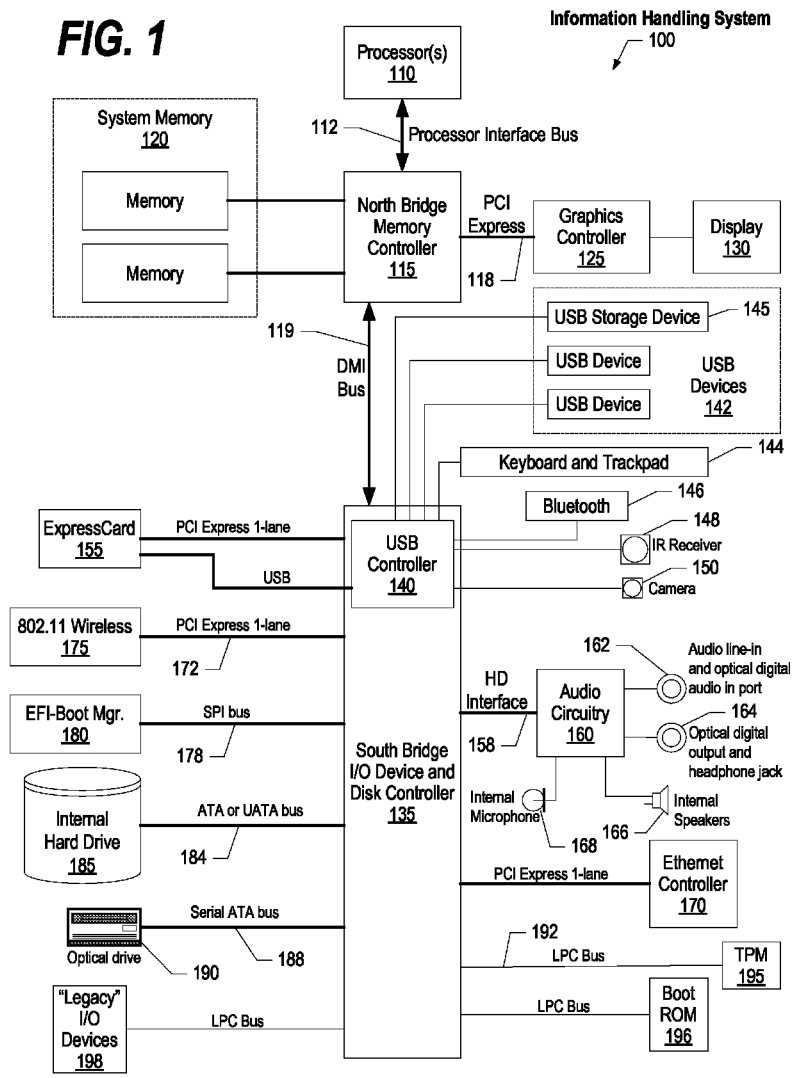
FIG. 1 is a block diagram of a data processing system in which the methods described herein can be implemented.
Figure 2:
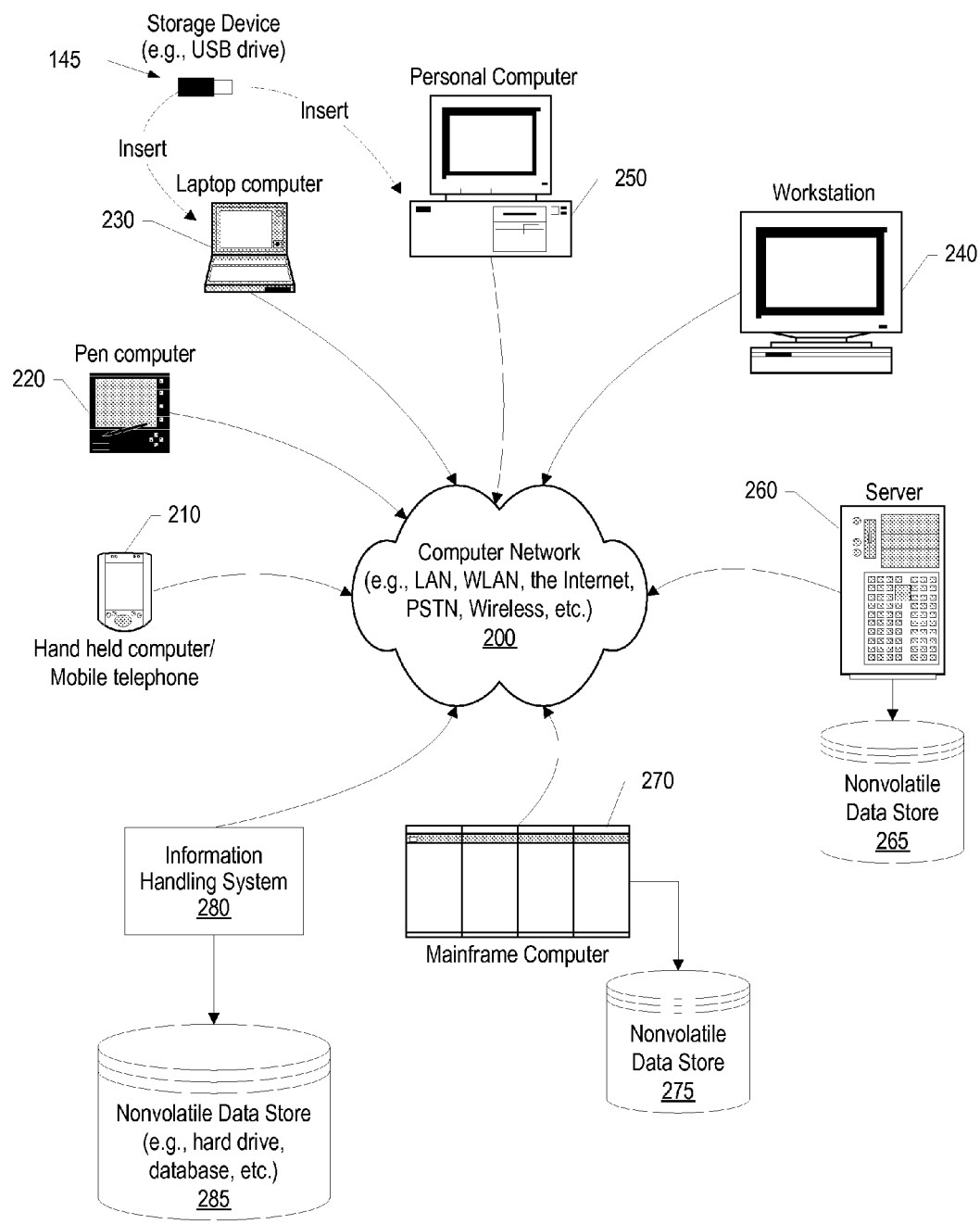
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE .802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
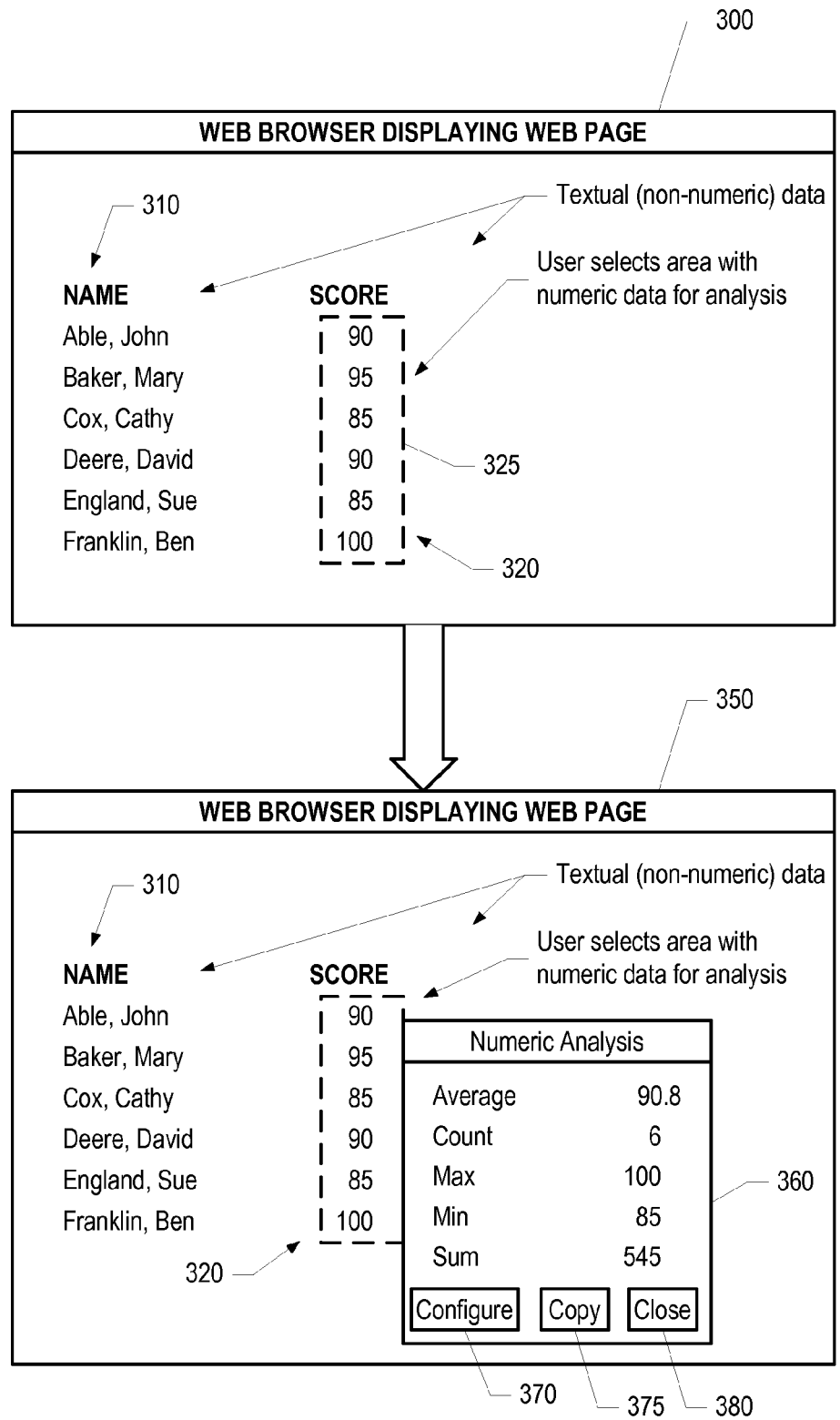
FIG. 3 is a diagram showing a supplementary numeric analysis tool applied against a selected set of data elements within a Web browser software application.

FIG. 3 is a diagram showing a supplementary numeric analysis tool applied against a selected set of data elements within a Web browser software application. Screen 300 depicts a page within a Web browser software application that is displaying both textual (non-numeric) and numeric data. In the example shown, textual data 310 is a column that displays list of people's names (e.g., in a class, on a team, etc.) and each of these names correspond with a data element in column 320 which, in the example, is a list of scores that each correspond with one of the displayed people. However, because the Web browser software application treats all displayed data as textual data, the user is unable to perform numeric functions on the numeric data elements within the Web browser without additional functionality. This additional functionality is provided by a software tool, such as a plug-in software component that adds these numeric computational abilities to the Web browser software application. After the tool, such as the plug-in component, has been installed, the user selects data upon which the functions (e.g., numeric or date functions, etc.) are to be performed. Traditional selection methods are utilized by the user to select the data elements, such as by holding down a mouse button while scrolling the cursor (controlled with the mouse) over the desired data. In the example shown in FIG. 3, the selected numeric data is column 320 which is shown as selected (e.g., highlighted, etc.) as depicted by the dashed box outlining the data. As will be appreciated by those skilled in the art, several selection methodologies exist using various input devices such as the mouse, as described above, the keyboard, a trackpad, etc. In addition, the data elements selected do not have to be contiguous on the display screen as the user can individually select the data elements using an alternative selection mechanism (e.g., holding down the "control" key while selecting items with the mouse, etc.). When discontiguously displayed data elements are selected, each of the data elements will be visually highlighted so that the user is aware of the selected data elements. Once the data elements are selected the software tool analyzes the selected data elements using various numeric or date functions, depending on whether the selected data elements consist of numeric items or date items. In one embodiment, the software tool is invoked using an icon, menu item, or key combination while, in another embodiment, the tool is invoked when the user is finished selecting data items in the Web browser software application.

Figure 4:
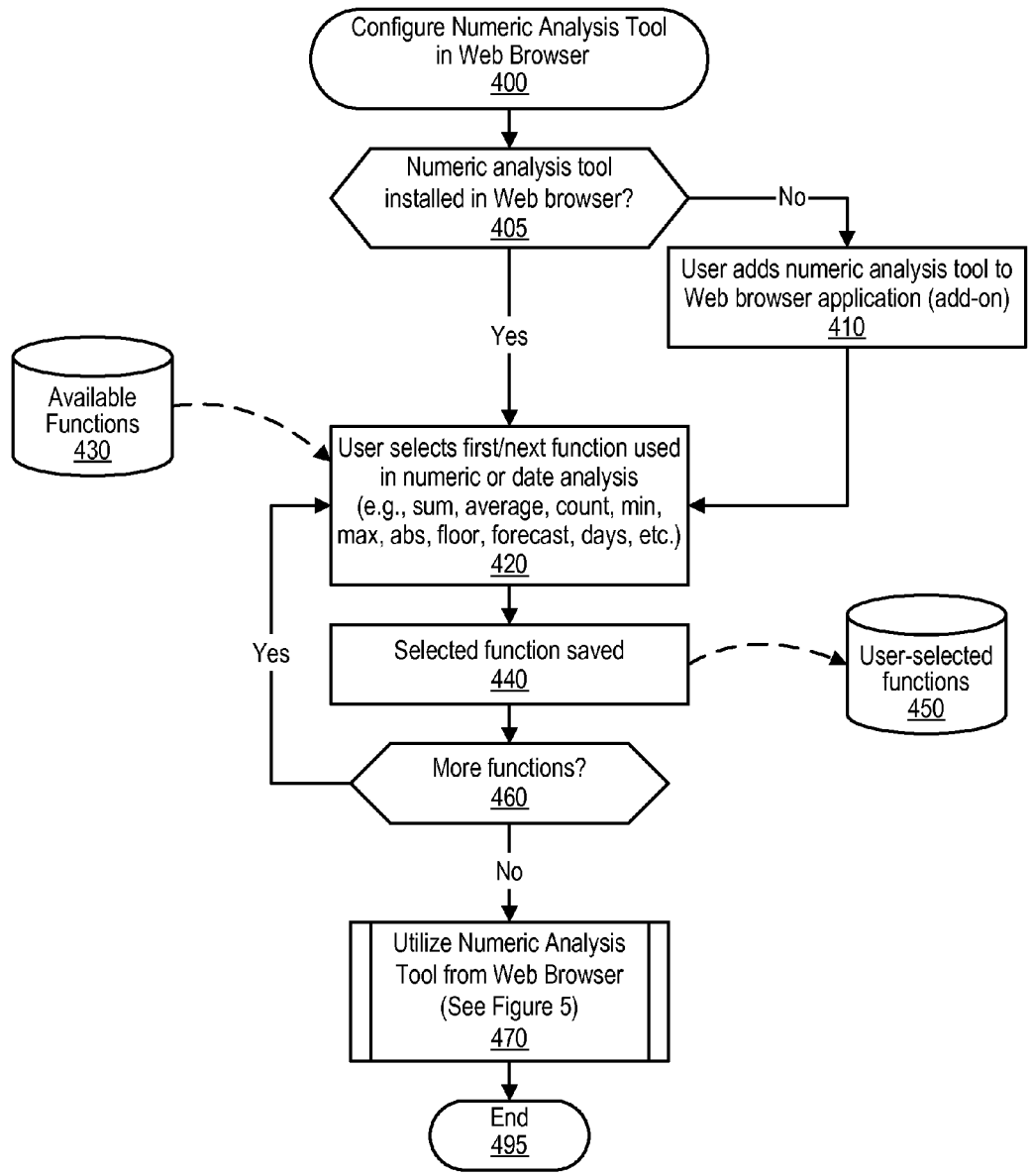
FIG. 4 is a flowchart depicting steps taken in configuring the numeric analysis tool by a user.
Figure 8:
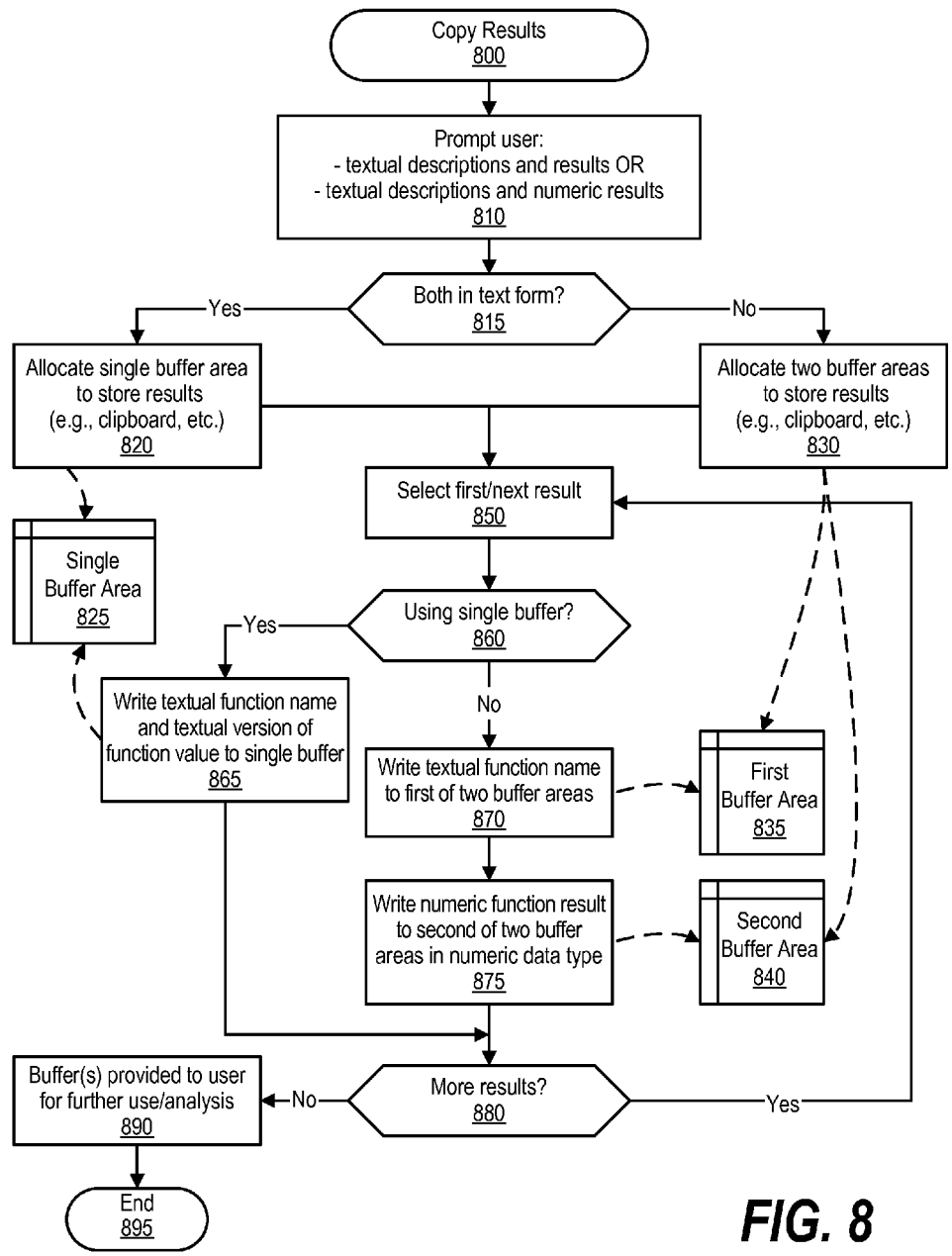
FIG. 8 is a flowchart depicting steps taken in copying resulting data to one or more buffers so that the resulting data can be further processed by the user.

Screen 350 depicts the result of the software tool operating on selected data elements 325. When the tool operates, window 360 is displayed with the results of one or more functions that used the selected data elements as input. In the example shown, the functions included the average (mean), count, maximum value, minimum value, and sum (summation) of the selected data elements. Window 360 includes various options that the user can select using command buttons 370, 375, and 380. Command button 370 is labeled "Configure" and is selected by the user if the user wishes to configure the tool (e.g., to select different functions, etc.). The flowchart depicting the steps taken to configure the tool is shown in FIG. 4. Command button 375 is labeled "Copy" and is used by the user to copy the results to one or more buffer areas. The flowchart depicting the steps taken to copy the results to one or more buffer areas is shown in FIG. 8. Command button 380 is labeled "Close" and is used by the user to close window 360.

FIG. 4 is a flowchart depicting steps taken in configuring the numeric analysis tool by a user. Processing commences at 400 whereupon, a decision is made by the user as to whether the numeric analysis tool has been installed in the Web browser software application that is executing on the user's computer system (decision 405). If the user has not yet installed the numeric analysis tool, then decision 405 branches to the "no" branch whereupon, at step 410, the user installs the numeric analysis tool to their Web browser software application (e.g., as an plug-in component, etc.) using the plug-in installer functionality of the particular Web browser software application. On the other hand, if the user has already installed the numeric analysis tool, then decision 405 branches to the "yes" branch bypassing step 410. In addition, in one embodiment, the numeric analysis tool is included in the Web browser tool by the Web browser software application provider so that the tool is available to users when the Web browser software application is installed by the user.

At step 420, the user selects the first function that the user desires to use to analyze numeric or date information. Examples of numeric functions include sum, average, count, min, max, abs, floor, etc. while examples of date functions include days (number of days between two dates), dow (day of week), etc. In one embodiment, the user selects the function from a list of available functions (data store 430) that are included with the numeric analysis tool. At step 440, the function that was selected by the user in step 420 is saved to user-selected functions data store 450. A decision is made as to whether the user wishes to select additional functions (decision 460). If the user wishes to select additional functions, then decision 460 branches to the "yes" branch which loops back to step 420 so that the user can select another numeric/date function to include in the analysis performed by the tool. This looping continues until the user does not wish to select any additional numeric/date functions at which time decision 460 branches to the "no" branch whereupon the user utilizes the numeric analysis tool from the Web browser software application executing on the user's computer system (predefined process 470, see FIG. 5 and corresponding text for processing details). Processing thereafter ends at 495.

Figure 5:
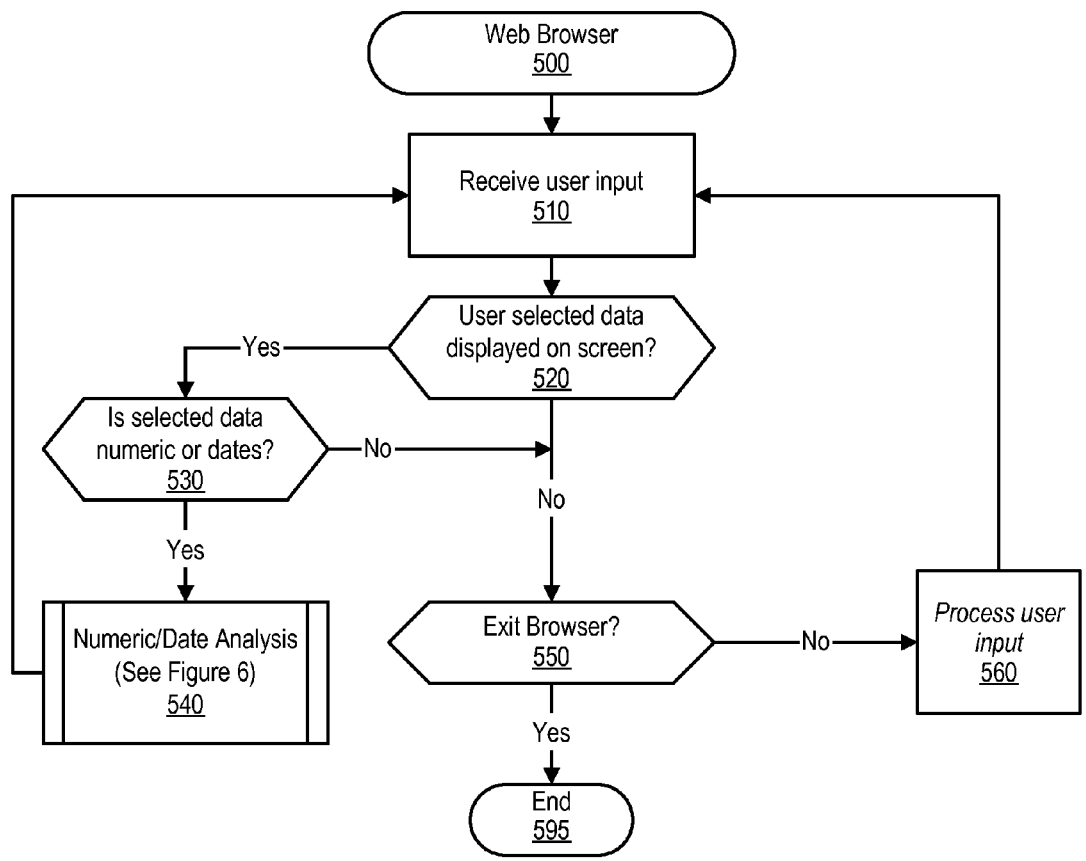
FIG. 5 is a flowchart depicting steps taken in invoking the numeric analysis tool from the Web browser software application.

FIG. 5 is a flowchart depicting steps taken in invoking the numeric analysis tool from the Web browser software application. Web browser software application processing commences at 500 whereupon, at step 510, user input is received at the Web browser (e.g., mouse clicks, menu selections, toolbar icon selections, etc.). A decision is made as to whether the user has selected data elements that are being displayed by the Web browser (decision 520). If the user has selected data elements, then decision 520 branches to the "yes" branch whereupon a decision is made as to whether the user has selected numeric data elements or date data elements (decision 530). If the user has selected numeric data elements or date data elements, then decision 530 branches to the "yes" branch whereupon, at predefined process 540, the numeric/date analysis tool is invoked (see FIG. 6 and corresponding text for processing details). As previously described, the numeric/date analysis tool can be incorporated in the Web browser software application as a separately installed component (e.g., a plug-in component, etc.) or as a built-in part of the Web browser software application. After the numeric/date analysis tool has completed, processing loops back to receive the next user input.

On the other hand, if the user either did not select data on the display screen (in which case decision 520 branches to the "no" branch) or if the data selected by the user is not numeric or date data (in which case decision 530 branches to the "no" branch), then a decision is made as to whether the user has requested to exit the Web browser software application (decision 550), e.g., by closing the application, etc. If the user did not request to exit the Web browser software application, then decision 550 branches to the "no" branch whereupon, at step 560, the user's input is processed and processing loops back to step 510 in order to receive and process the next user input. This looping continues until the user decides to exit the Web browser software application, at which point decision 550 branches to the "yes" branch and the Web browser software application ends at 595.

Figure 6:
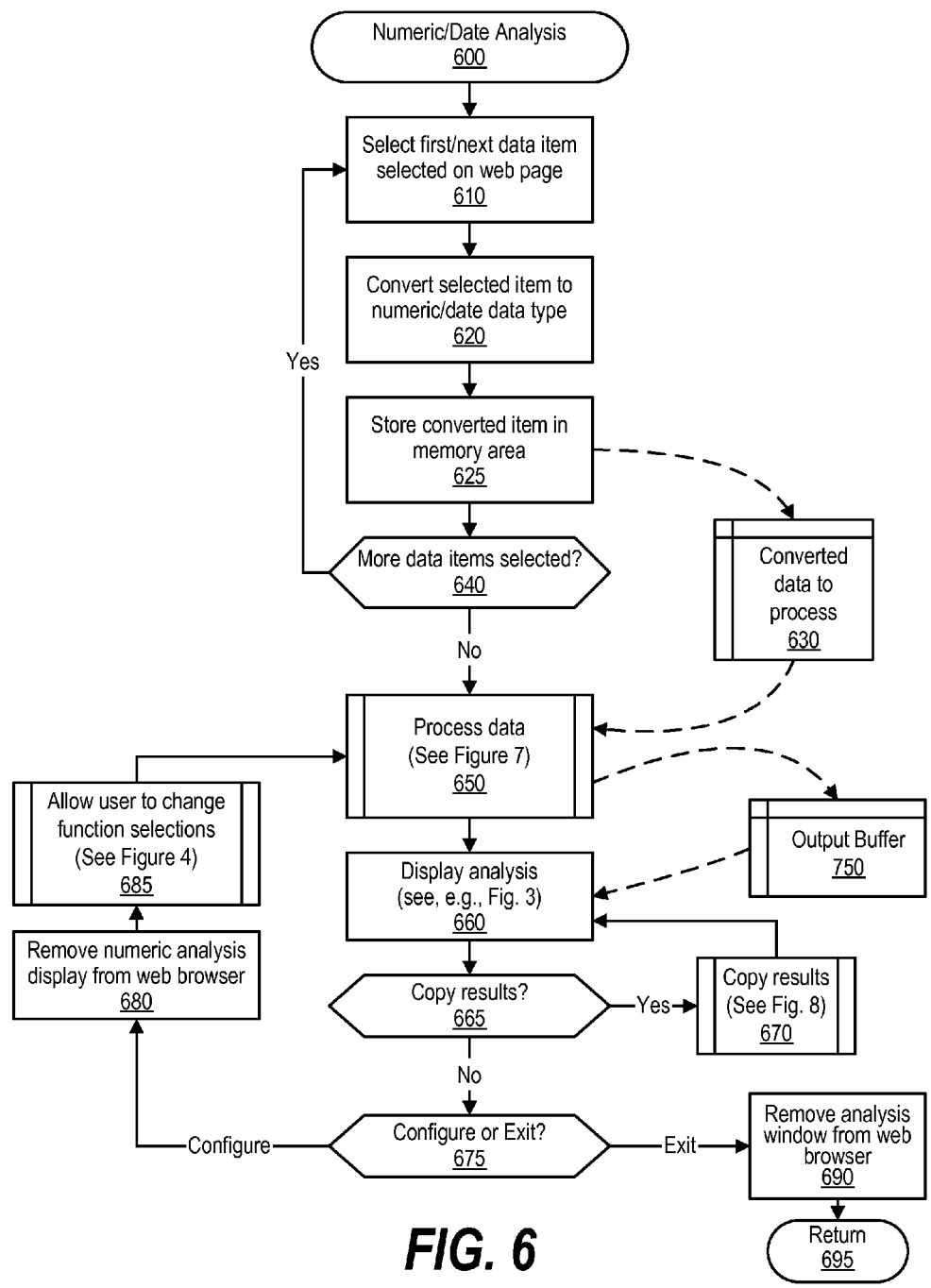
FIG. 6 is a flowchart depicting steps taken by the numeric analysis tool when invoked from the Web browser software application.

FIG. 6 is a flowchart depicting steps taken by the numeric analysis tool when invoked from the Web browser software application. Numeric/date software component processing commences at 600 having been called by the Web browser software application being used by the user. As previously described, this numeric/date analysis component can be integrated into the Web browser software application or can be installed as a separate "plug-in" component to provide this additional functionality to the Web browser. The numeric/date analysis component is called after the user has selected data elements that are being displayed by the Web browser.

At step 610 the numeric/date analysis tool selects the first data element selected by the user. At step 620, the selected data element is converted to the proper data type. In FIG. 5 it was determined whether the data selected by the user was numeric data or date-type data. If the data selected by the user is numeric data, then at step 620 the selected data element is converted to a numeric data type (e.g., floating point, integer, etc.). However, if the data selected by the user is date-type data, then at step 620 the selected data element is converted to a date type (e.g., serial date, serial date-time, etc.). As previously discussed, the data elements displayed by the Web browser software application are stored in a textual format making numeric and/or date computations difficult. Therefore, in one embodiment, the date is converted to the proper type before being processed by the applicable functions. At step 625, the converted data element is stored in memory area 630 for future processing. A decision is made as to whether there are more data elements that were selected by the user (decision 640). If there are additional data elements selected by the user, then decision 640 branches to the "yes" branch which loops back to select and process the next data element as described above. This looping continues until all of the date elements selected by the user have been converted into the proper format and the converted data has been stored in memory area 630. When all of the selected data elements have been processed, then decision 640 branches to the "no" branch for further processing. In addition, as previously described, the date elements selected by the user do not have to be displayed contiguously on the display screen as the user may have used an alternate selection technique (e.g., holding the "control" key down while individually selecting data elements with the mouse, etc.).

Figure 7:
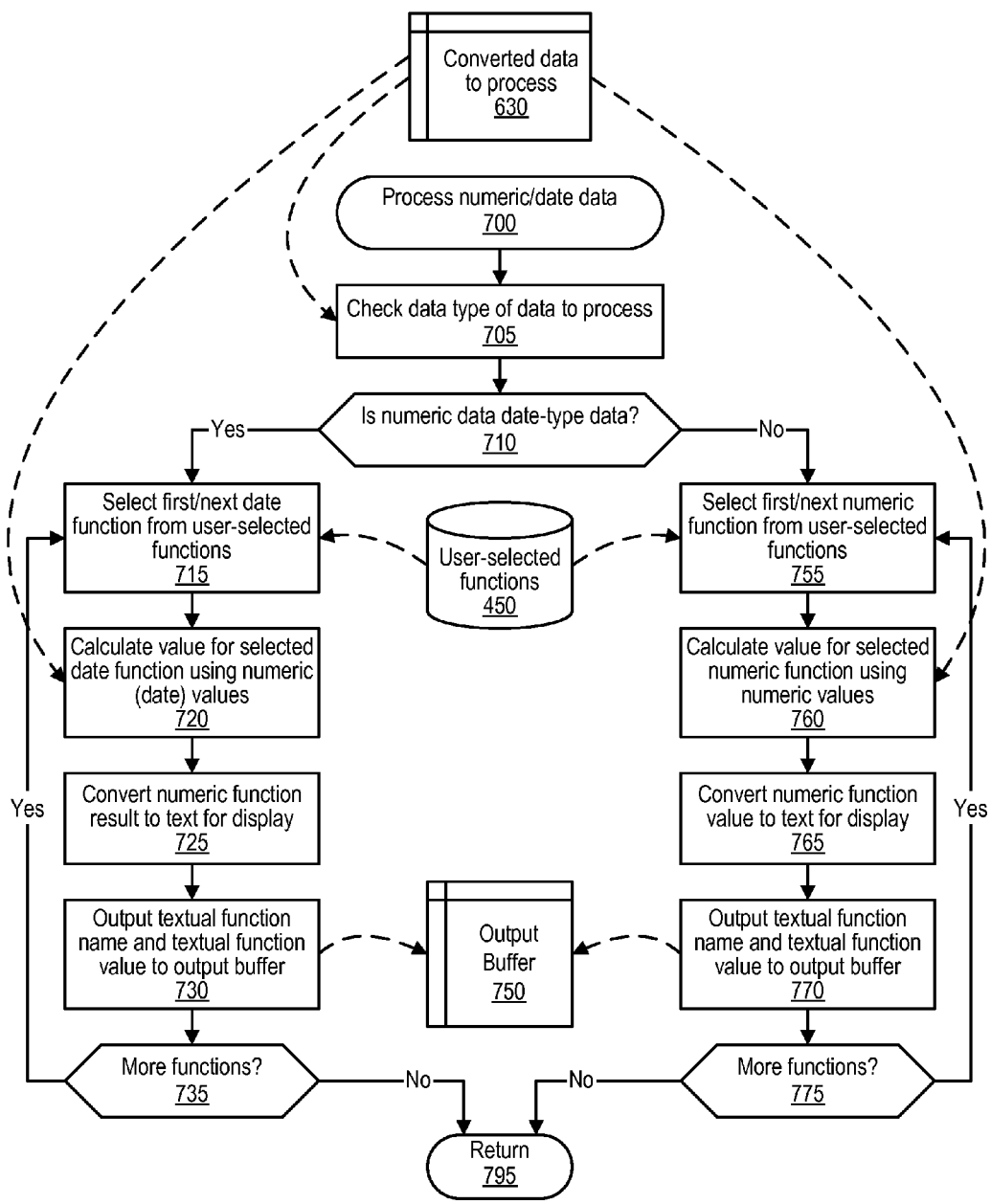
FIG. 7 is a flowchart depicting steps taken by the numeric analysis tool to process data selected by the user in the Web browser software application.

At predefined process 650 the converted data elements are processed by the various functions (e.g., numeric functions for numeric data, date functions for date-type data, etc.). FIG. 7 and corresponding text below provide details regarding the processing of the converted data using the various functions. Data resulting from predefined process 650 is stored in output buffer 750. Output buffer 750 is retrieved at step 660 to display the analysis results (e.g., results of the various functions, etc., see FIG. 3, window 360, and corresponding text for an example of the displayed analysis).

A decision is made as to whether the user has requested to copy the result data (decision 665, e.g., by the user selecting "copy" command button 375 provided in window 360 shown in FIG. 3). If the user has requested to copy the results, then decision 665 branches to the "yes" branch whereupon, at predefined process 670, the results are copied to one or more buffers as chosen by the user (see FIG. 8 and corresponding text for processing details), after which processing loops back to display the analysis results at step 660.

If the user has not requested to copy the result data, then decision 665 branches to the "no" branch whereupon a decision is made as to whether the user has requested to either configure the numerical/data analysis tool (decision 675, e.g., determined by the user selecting "configure" command button 370 provided in window 360 shown in FIG. 3 or by the user selecting "close" command button 380 provided in window 360 also shown in FIG. 3). If the user has selected to configure the numerical/data analysis tool, then decision 675 branches to the "configure" branch whereupon, at step 680, the analysis window (e.g., window 360 shown in FIG. 3) is removed from the display and at predefined process 685 the user is allowed to select (change) the functions that are used to process the selected data elements (see FIG. 4 and corresponding text for processing details). Processing then loops back to predefined process 650 that processes the user selected data elements, now using the newly selected functions chosen by the user in predefined process 685. The looping shown continues until the user selects to exit the display of the analysis results, at which point decision 675 branches to the "exit" branch whereupon, at step 690, the analysis window (e.g., window 360 shown in FIG. 3) is removed from the Web browser software application display and processing returns to the calling routine (see FIG. 5) at 695.

FIG. 7 is a flowchart depicting steps taken by the numeric analysis tool to process data selected by the user in the Web browser software application. Processing commences at 700 whereupon, at step 705, the process checks the data type of the data that is being processed that is stored in converted data memory area 630. A decision is made as to whether the data that is being processed is date-type data (decision 710). If the data is date-type data, then decision 710 branches to the "yes" branch whereupon, at step 715 the first date-type function (e.g., days, dow, etc.) is selected from user selected functions data store 450. At step 720, the converted data stored in memory area 630 (all data elements) are processed by the selected date function with the processing resulting in a result (e.g., a numeric value). At step 725, a numeric function result is converted to a textual format for eventual display on the Web browser software application. At step 730, the textual function name (e.g., "Days", etc.) is output to output buffer 750 along with the textual value of the function result (e.g., "325", etc.). A decision is made as to whether there are additional date functions that the user has selected that still need to be processed (decision 735). If there are additional date functions to process, then decision 735 branches to the "yes" branch which loops back to step 715 to select the next date function from data store 450 and process it as described above. This looping continues until there are no more date functions to process, at which point decision 735 branches to the "no" branch whereupon processing returns to the calling routine (see FIG. 6) at 795.

Returning to decision 710, if the data is numeric-type data, then decision 710 branches to the "no" branch whereupon, at step 755 the first numeric function (e.g., sum, average, etc.) is selected from user selected functions data store 450. At step 760, the converted data stored in memory area 630 (all data elements) are processed by the selected date function with the processing resulting in a result (e.g., a numeric value). At step 765, a numeric function result is converted to a textual format for eventual display on the Web browser software application. At step 770, the textual function name (e.g., "Sum", "Average", etc.) is output to output buffer 750 along with the textual value of the function result (e.g., "545", "90.8", etc.). A decision is made as to whether there are additional numeric functions that the user has selected that still need to be processed (decision 775). If there are additional date functions to process, then decision 775 branches to the "yes" branch which loops back to step 755 to select the next numeric function from data store 450 and process it as described above. This looping continues until there are no more numeric functions to process, at which point decision 775 branches to the "no" branch whereupon processing returns to the calling routine (see FIG. 6) at 795.

FIG. 8 is a flowchart depicting steps taken in copying resulting data to one or more buffers so that the resulting data can be further processed by the user. Processing commences at 800 whereupon, at step 810, the user is prompted as to whether the user wishes to copy the analysis function names and results to a single buffer as text-formatted data or whether the user wishes to copy the analysis function names to a first buffer as text-formatted data and copy the analysis function values to a second buffer as numeric-formatted data. A decision is made as to whether the user has selected to copy both the analysis names and function result values to a single buffer in text-format (decision 815). If the user has selected to copy both the analysis names and function result values to a single buffer, then decision 815 branches to the "yes" branch whereupon, at step 820, single buffer area 825 is allocated to store the result data (e.g., the system clipboard, a buffer memory, etc.). On the other hand, if the user has requested to copy the analysis function names to a first buffer as text-formatted data and copy the analysis function values to a second buffer as numeric-formatted data, then decision 815 branches to the "no" branch whereupon, at step 830, two buffer areas 835 and 840 are allocated with buffer area 835 used to store the analysis function names (e.g., "Sum", "Average", etc.) and buffer area 840 used to store the analysis function values in numeric-formatted type (e.g., 545, 90.8, etc.).

At step 850, the first analysis result is selected from analysis display window 360. A decision is made as to whether a single buffer is being used to store the copied results (decision 860). If a single buffer is being used, then decision 860 branches to the "yes" branch whereupon, at step 865, the textual function name is written to buffer 825 along with the textual version of the function result value (e.g., "Sum 545", etc.). On the other hand, if two buffers are being used to store the copied results, then decision 860 branches to the "no" branch whereupon, at step 870, the textual function names are written to first buffer area 835 (e.g., "Sum", etc.) and, at step 875, the numeric function result values are written to second buffer area 840 (e.g., 545, etc.).

A decision is made as to whether there are more analysis function results to process and write to the buffer(s) (decision 880). If there are more analysis function results to process and write to the buffers, then decision 880 branches to the "yes" branch which loops back to select and process the next analysis function result displayed in the analysis results window (e.g., window 360 shown in FIG. 3). This looping continues until all of the results have been processed, at which point decision 880 branches to the "no" branch whereupon, at step 890 the buffer (or buffers) used to store the analysis results are closed and provided to the user for further use and analysis. Processing thereafter returns to the calling routine (FIG. 6) at 895.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
   one or more processors;
   a memory coupled to at least one of the processors;
   a set of instructions stored in the memory and executed by at least one of the processors in order to perform actions of:
      receiving a user selection of a plurality of numeric data elements stored in a textual format, wherein each of the selected data elements is displayed in a Web browser software application window that is displayed on a display screen;
      converting the textual format of each of the plurality of numeric data elements to a numeric format, resulting in a converted plurality of numeric data elements;
      generating a first set of resulting values by applying one or more pre-configured functions to the converted plurality of numeric data elements;
      converting the first set of resulting values to a textual format, resulting in a converted first set of resulting values; and
      displaying the converted first set of resulting values in a different window that appears on the display screen.

2. The information handling system of claim 1 wherein the set of instructions performs additional actions comprising:
   determining that each of the selected plurality of numeric data elements is a numeric value, wherein each of the one or more pre-configured functions are numeric analysis functions.

3. The information handling system of claim 2 wherein the set of instructions performs additional actions comprising:
   storing each of the converted plurality of numeric data elements in a memory area, wherein the set of instructions reads the stored converted plurality of data elements from the memory area.

4. The information handling system of claim 1 wherein the set of instructions performs additional actions comprising:
receiving a different user selection of a different plurality of numeric data elements stored in the textual format;
determining that each of the selected different plurality of numeric data elements is a date value, wherein each of the one or more pre-configured functions are date analysis functions.

5. The information handling system of claim 4 wherein the set of instructions performs additional actions comprising:
converting each of the plurality of selected different numeric data elements from the textual format to a date data type format; and
storing each of the converted different plurality of numeric data elements in a memory area, wherein the set of instructions reads the stored converted different plurality of data elements from the memory area.

6. The information handling system of claim 1 wherein the selected plurality of numeric data elements are displayed discontiguously on the display screen.

7. The information handling system of claim 1 wherein the set of instructions performs additional actions comprising:
configuring a software tool, wherein the configuring comprises:
selecting a plurality of functions from a set of available functions; and
saving the selected plurality of functions as user-selected functions.

8. The information handling system of claim 7 wherein the configuring is performed in response to a user request that was received at the different window, and wherein the set of instructions performs additional actions comprising:
identifying a different set of one or more functions that apply to the selected plurality of numeric data elements, wherein the different set of functions include at least one of the user-selected functions saved during the configuring;
applying the identified different set of functions to the selected plurality of numeric data elements resulting in a different set of one or more resulting values; and
displaying the different set of resulting values in the different window that appears on the display screen.

9. The information handling system of claim 7 wherein the configuring is performed prior to receiving the user selection of the plurality of numeric data elements, and wherein the one or more pre-configured functions are selected from the saved user-selected functions.

10. The information handling system of claim 1, wherein the displaying of the converted first set of resulting values includes displaying a function name corresponding to each of the resulting values adjacent to the respective resulting values, and wherein the set of instructions performs additional actions comprising:
after the displaying of the converted first set of resulting values, receiving a copy request at the different window that appears on the display screen;
copying the converted first set of resulting values to a memory area, the copying further comprising:
receiving an output data type selection;
in response to the output data type selection being a text data type:
copying the displayed function names and resulting values to a first output buffer, wherein the function names and the resulting values are stored in the textual format;
in response to the output data type selection being a numeric data type:
copying the displayed function names to the first output buffer, wherein the function names are stored in the textual format;
copying the converted first set of resulting values in a second output buffer, wherein the converted first set of resulting values are stored in the numeric format.

11. A computer program product stored in a computer readable storage device, comprising functional descriptive material that, when executed by an information handling system, causes the information handling system to perform actions that include:
receiving a user selection of a plurality of numeric data elements stored in a textual format, wherein each of the selected data elements is displayed in a Web browser software application window that is displayed on a display screen;
converting the textual format of each of the plurality of numeric data elements to a numeric format, resulting in a converted plurality of numeric data elements;
generating a first set of resulting values by applying one or more pre-configured functions to the converted plurality of numeric data elements;
converting the first set of resulting values to a textual format, resulting in a converted first set of resulting values; and
displaying the converted first set of resulting values in a different window that appears on the display screen.

12. The computer program product of claim 11 wherein the actions further comprise:
determining that each of the selected plurality of numeric data elements is a numeric value, wherein each of the one or more pre-configured functions are numeric analysis functions.

13. The computer program product of claim 12 wherein the actions further comprise:
storing each of the converted plurality of numeric data elements in a memory area, wherein the set of instructions reads the stored converted plurality of data elements from the memory area.

14. The computer program product of claim 11 wherein the actions further comprise:
receiving a different user selection of a different plurality of numeric data elements stored in the textual format;
determining that each of the selected different plurality of numeric data elements is a date value, wherein each of the one or more pre-configured functions are date analysis functions.

15. The computer program product of claim 14 wherein the actions further comprise:
converting each of the plurality of selected different numeric data elements from the textual format to a date data type format; and
storing each of the converted different plurality of numeric data elements in a memory area.

16. The computer program product of claim 1 wherein the selected plurality of numeric data elements are displayed discontiguously on the display screen.

17. The computer program product of claim 1 wherein the actions further comprise:
configuring a software tool, wherein the configuring comprises:
selecting a plurality of functions from a set of available functions; and
saving the selected plurality of functions as user-selected functions.

18. The computer program product of claim 17 wherein the configuring is performed in response to a user request that was received at the different window, and wherein the actions further comprise:
- identifying a different set of one or more functions that apply to the selected plurality of numeric data elements, wherein the different set of functions include at least one of the user-selected functions saved during the configuring;
- applying the identified different set of functions to the selected plurality of numeric data elements resulting in a different set of one or more resulting values; and
- displaying the different set of resulting values in the different window that appears on the display screen.

19. The computer program product of claim 17 wherein the configuring is performed prior to receiving the user selection of the plurality of numeric data elements, and wherein the one or more pre-configured functions are selected from the saved user-selected functions.

20. The computer program product of claim 11, wherein the displaying of the converted first set of resulting values includes displaying a function name corresponding to each of the resulting values adjacent to the respective resulting values, and wherein the actions further comprise:
- after the displaying of the converted first set of resulting values, receiving a copy request at the different window that appears on the display screen;
- copying the converted first set of resulting values to a memory area, the copying further comprising:
- receiving an output data type selection;
- in response to the output data type selection being a text data type:
  - copying the displayed function names and resulting values to a first output buffer, wherein the function names and the resulting values are stored in the textual format;
- in response to the output data type selection being a numeric data type:
  - copying the displayed function names to the first output buffer, wherein the function names are stored in the textual format;
  - copying the converted first set of resulting values in a second output buffer, wherein the converted first set of resulting values are stored in the numeric format.

* * * * *